United States Patent
Wang et al.

(10) Patent No.: US 12,362,687 B2
(45) Date of Patent: Jul. 15, 2025

(54) CONTROL METHOD FOR SEMI-CENTRALIZED OPEN WINDING MULTI-MOTOR DRIVE SYSTEM

(71) Applicant: SOUTHEAST UNIVERSITY, Nanjing (CN)

(72) Inventors: Wei Wang, Nanjing (CN); Weijie Tian, Nanjing (CN); Ming Cheng, Nanjing (CN)

(73) Assignee: SOUTHEAST UNIVERSITY, Jiangsu (CN)

(*) Notice: Subject to any disclaimer, the term of this patent is extended or adjusted under 35 U.S.C. 154(b) by 0 days.

(21) Appl. No.: 18/550,652

(22) PCT Filed: Apr. 12, 2023

(86) PCT No.: PCT/CN2023/087733
§ 371 (c)(1),
(2) Date: Sep. 14, 2023

(87) PCT Pub. No.: WO2024/060591
PCT Pub. Date: Mar. 28, 2024

(65) Prior Publication Data
US 2024/0178768 A1 May 30, 2024

(30) Foreign Application Priority Data
Sep. 19, 2022 (CN) .......................... 202211147864.7

(51) Int. Cl.
*H02P 7/00* (2016.01)
*H02P 5/48* (2016.01)
(Continued)

(52) U.S. Cl.
CPC .............. *H02P 5/48* (2013.01); *H02P 21/141* (2013.01); *H02P 21/22* (2016.02); *H02P 27/06* (2013.01)

(58) Field of Classification Search
CPC .......... H02P 5/48; H02P 21/141; H02P 21/22; H02P 27/06; H02P 5/747; H02P 21/0003; H02P 5/46; H02P 5/52; H02P 21/14
See application file for complete search history.

(56) References Cited

U.S. PATENT DOCUMENTS

2014/0159632 A1* 6/2014 Kim ........................ H02P 6/188
318/400.34

FOREIGN PATENT DOCUMENTS

| CN | 112865613 A | 5/2021 |
|---|---|---|
| CN | 114679088 A | 6/2022 |

(Continued)

OTHER PUBLICATIONS

Si et al., Active reconfigurable and fault-tolerant control technology for high reliability motor system, Acta Aeronautica et Astronautica Sinica, Nov. 25, 2021, vol. 42 No. 11, 15 pages.

(Continued)

*Primary Examiner* — Muhammad S Islam
(74) *Attorney, Agent, or Firm* — MUNCY, GEISSLER, OLDS & LOWE, P.C.

(57) ABSTRACT

A control method for a semi-centralized open winding multi-motor drive system includes: first, measuring current, voltage and position signal, computing system thrust by a velocity loop; then, distributing the thrust to each motor, converting the thrust into q axis current, computing dq axis voltages required for each motor by a current loop, and transforming the voltage demand to abc coordinate system through coordinate transformation; subsequently, modulating the voltage of each motor into a duty ratio instruction to judge whether the motor is in an over-modulated operating area, and performing over-modulation processing on the voltage in the over-modulated area; and finally, distributing the duty ratio instructions to independent and shared inverters. The control method of the present disclosure can reduce (Continued)

the hardware cost and improve the safety and reliability of the system.

1 Claim, 5 Drawing Sheets

(51) Int. Cl.
  *H02P 21/14* (2016.01)
  *H02P 21/22* (2016.01)
  *H02P 27/06* (2006.01)

(56) References Cited

FOREIGN PATENT DOCUMENTS

| CN | 114944803 A | 8/2022 |
|---|---|---|
| JP | 2020031458 A | 2/2020 |

OTHER PUBLICATIONS

An et al., Dual-Space Vector Control of Open-End Winding Permanent Magnet Synchronous Motor Drive Fed by Dual Inverter, Transactions on Power Electronics Dec. 31, 2016, IEEE, 12 pages.

\* cited by examiner

CONTROL METHOD FOR SEMI-CENTRALIZED OPEN WINDING MULTI-MOTOR DRIVE SYSTEM

TECHNICAL FIELD

The present disclosure belongs to the field of motor control, and specifically relates to a control method for a semi-centralized open winding multi-motor drive system.

BACKGROUND

In a case that a power supply voltage is unchanged, in order to increase the limit velocity of a motor during operation, the usual approach is to open an end winding of the motor and connect an inverter to each of both ends to form an open winding topology for power supply, so that maximum voltages applied to both ends of the motor are increased. However, the increase in the number of switching devices will bring two problems: firstly, the hardware cost of a driver is increased; and secondly, the fault probability of the driver is increased.

At present, in order to reduce the number of switching devices, multiple control topologies are proposed: a three-bridge arm dual-motor topology, a five-bridge arm dual-motor topology, a semi-centralized open winding dual-motor topology, and the like. The three-bridge arm dual-motor topology can reduce the number of switching devices to the maximum, but the requirements for operating conditions of dual motors are relatively strict. This topology requires similar operating conditions for both motors. The five-bridge arm dual-motor topology reduces the use of switching devices by sharing one bridge arm for two motors. This topology can adapt to different operating conditions of the two motors. In the semi-centralized open winding dual-motor topology, two inverters are used on one side of two motors for power supply, while the other sides share one inverter for power supply. Compared to the five-bridge arm dual-motor topology, this control topology can further reduce the number of switching tubes in the motor and can also adapt to different operating conditions of the motor. This topology has the disadvantage that it is only applicable to two motor systems, but for conditions where multiple motors are put into operation, the drive control algorithm of this system is difficult to apply.

SUMMARY

In view of the defects in existing technologies, an objective of the present disclosure is to provide a control method for a semi-centralized open winding multi-motor drive system to solve the problems in the above background art.

The objective of the present disclosure can be achieved by the following technical solution:

A control method for a semi-centralized open winding multi-motor drive system is provided. The control method includes:

first, measuring a current and a direct current bus voltage of a system by a hardware circuit, measuring an angle of each motor by a position sensor, computing a system velocity, and computing a thrust of the motor drive system by a velocity loop; then, distributing the thrust to each motor based on the rated current, flux linkage and thrust of each motor, converting the thrust into the form of a q axis current, computing a dq axis voltage required for each motor by a current loop, and transforming the voltage demand to an abc coordinate system through coordinate transformation; subsequently, modulating the voltage of each motor into a duty ratio instruction to judge whether the motor is in an over-modulated operating area, and performing over-modulation processing on the voltage in the over-modulated area; and finally, distributing the duty ratio instruction of the motor to an independent inverter and a shared inverter.

Preferably, the drive system is composed of N motors (N>0), one side of each rotor winding is respectively connected to an independent inverter, the other sides of all rotor windings are connected to a shared inverter together, and all rotors are rigidly connected.

Preferably, in the drive system, a q axis current instruction $i^*_{q\_x}$ is distributed to a motor according to a thrust demand $F^*_e$:

$$i^*_{q\_x} = \frac{\tau_s F^*_e}{3N\pi\psi_{f1}}$$

Preferably, a dq axis voltage is computed by a proportional integral (PI) regulator:

$$\begin{cases} u_{d\_x} = k_{p\_d\_x}(i^*_{d\_x} - i_{d\_x}) + k_{i\_d\_x}\int(i^*_{d\_x} - i_{d\_x})dt \\ u_{d\_x} = k_{p\_q\_x}(i^*_{q\_x} - i_{q\_x}) + k_{i\_q\_x}\int(i^*_{q\_x} - i_{q\_x})dt \end{cases}$$

and then, a zero sequence voltage is computed by a proportional resonant (PR) regulator, as shown in the form of discretization:

$$u_k = K_{p\_PI} * e_k + b_0 * e_k + b_2 * e_{k-2} - a_1 u_{k-1} - a_2 u_{k-2}$$

$$\begin{cases} a_0 = -a_2 = \frac{4K_s \omega_c T_s}{4 + 4\omega_c T_s + \omega_0^2 T_s^2} \\ a_1 = 0, b_1 = 1 \\ b_1 = \frac{2\omega_0^2 T_s^2 - 8}{4 + 4\omega_c T_s + \omega_0^2 T_s^2}, b_2 = \frac{4 - 4\omega_c T_s + \omega_0^2 T_s^2}{4 + 4\omega_c T_s + \omega_0^2 T_s^2} \end{cases}$$

Preferably, a dq axis reference voltage of each motor is converted to the abc coordinate system:

$$\begin{bmatrix} u^*_{a\_x} \\ u^*_{b\_x} \\ u^*_{c\_x} \end{bmatrix} = \begin{bmatrix} \cos(\theta_x) & -\sin(\theta_x) & 1 \\ \cos(\theta_x - \frac{2}{3}\pi) & -\sin(\theta_x - \frac{2}{3}\pi) & 1 \\ \cos(\theta_x + \frac{2}{3}\pi) & -\sin(\theta_x + \frac{2}{3}\pi) & 1 \end{bmatrix} \begin{bmatrix} u^*_{d\_x} \\ u^*_{q\_x} \\ u^*_{0\_x} \end{bmatrix}$$

Preferably, a voltage modulation process is as follows: first, a voltage modulation coefficient of each phase of each motor is computed:

$$m_{y\_x} = u^*_{y\_x}/u_{dc}$$

and then, limit values of the voltage modulation coefficient are computed:

$$\begin{cases} m_{y\_max} = \max\{m_{y\_I}, m_{y\_II}, \ldots, m_{y\_N}\} \\ m_{y\_min} = \min\{m_{y\_I}, m_{y\_II}, \ldots, m_{y\_N}\} \end{cases}$$

Preferably, a process of judging whether the motor is in an over-modulated operating area is as follows:

$$k = \max\{m_{a\_max} - m_{a\_min}, m_{b\_max} - m_{b\_min}, m_{c\_max} - m_{c\_min}\}$$

in a case that k>1, the motor is located in an over-modulated area; otherwise, the motor is located in a linear modulation area.

Preferably, the processing of the over-modulated area is as follows:

first, limit values of a corrected voltage modulation coefficient are computed:

$$\begin{cases} m^k_{y\_max} = \dfrac{m_{y\_max}}{\max\{1, m_{y\_max} - m_{y\_min}\}} \\ m^k_{y\_min} = \dfrac{m_{y\_min}}{\max\{1, m_{y\_max} - m_{y\_min}\}} \end{cases}$$

then, corrected limit coefficients ($k_{y\_x}^{max}$, $k_{y\_x}^{min}$) of the voltage modulation coefficient are computed:

$$\begin{cases} k_{y\_x}^{max} = \dfrac{\min\{m_{y\_x}, m^k_{y\_max}\}}{m_{y\_x}} \\ k_{y\_x}^{min} = \dfrac{\max\{m_{y\_x}, m^k_{y\_min}\}}{m_{y\_x}} \end{cases}$$

a phase correction coefficient $k_{y\_x}$ of the voltage modulation coefficient of each phase is computed:

$$k_{y\_x} = \min\{k_{y\_x}^{max}, k_{y\_x}^{min}\}$$

a correction coefficient $k_x$ of the motor of the voltage modulation coefficient is computed:

$$k_x = \min\{k_{a\_x}, k_{b\_x}, k_{c\_x}\}$$

a voltage modulation coefficient corrected value $m_y^k$ is computed by the corrected value and the voltage modulation coefficient:

$$m_{y\_x}^k = k_x m_{y\_x}$$

Preferably, a process of distributing a duty ratio instruction is as follows:

first, limit duty ratios ($\delta_{y\_s\_max}$, $\delta_{y\_s\_max}$) of a shared bridge arm are computed:

$$\begin{cases} \delta_{y\_s\_max} = \min\{1 - m^k_{y\_max}, 1\} \\ \delta_{y\_s\_min} = \max\{-m^k_{y\_min}, 0\} \end{cases}$$

then, an optimal duty ratio $\delta_{y\_s}$ of the shared bridge arm is computed by the limit duty ratios:

$$\delta_{y\_s} = \dfrac{\delta_{y\_s\_max} + \delta_{y\_s\_min}}{2}$$

and finally, a duty ratio of an independent bridge arm is computed based on the optimal duty ratio of the shared bridge arm and the voltage modulation coefficient:

$$\delta_{y\_x} = m_{y\_x}^k + \delta_{y\_P}$$

The present disclosure has the following beneficial effects:

1. The control method of the present disclosure expands a semi-centralized open winding system from a dual-motor system to a multi-motor system, which increases the utilization rate of the direct current bus voltage of the system and can reduce the number of switching devices in the drive system, thereby reducing the hardware cost of the motor, reducing the fault probability of the open winding drive system, and improving the safety and reliability of the system.

BRIEF DESCRIPTION OF THE DRAWINGS

To describe the technical solutions in the embodiments of the present disclosure or in existing technologies more clearly, the accompanying drawings required for describing the embodiments or existing technologies are briefly introduced below. Apparently, a person of ordinary skill in the art may still derive other drawings from these accompanying drawings without creative efforts.

DETAILED DESCRIPTION

Figure 1:
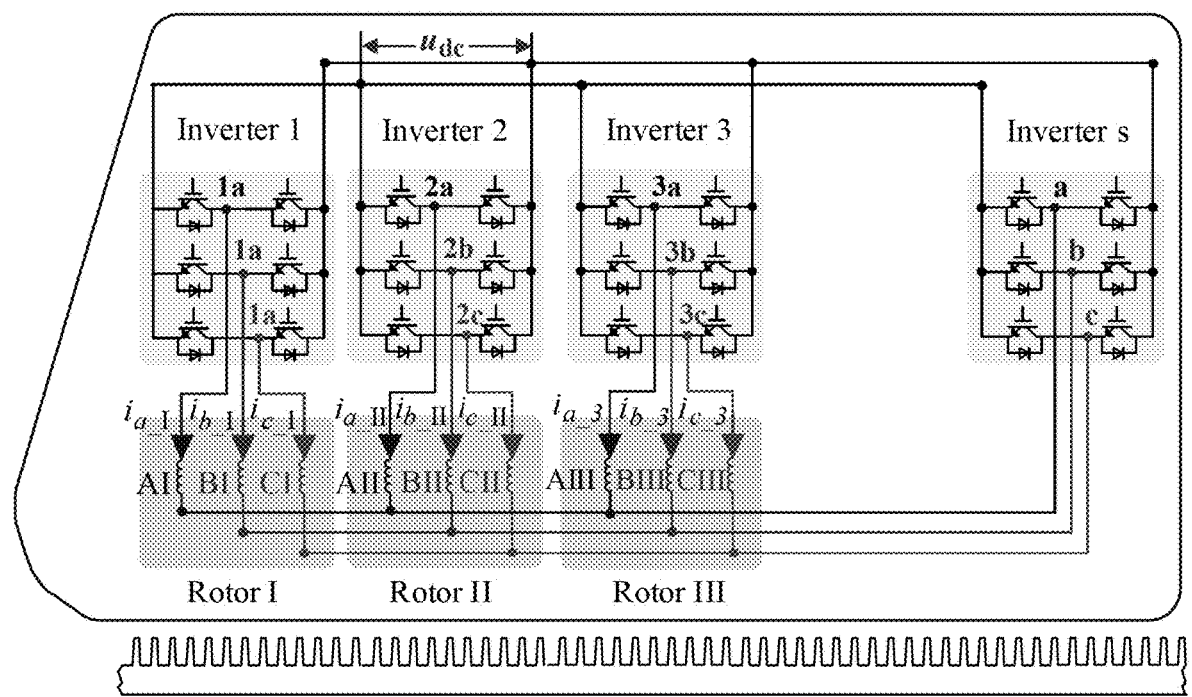
FIG. 1 is a multi-motor topological diagram of a semi-centralized open winding drive system in the present disclosure.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

As shown in FIG. 1 to FIG. 5, the present disclosure provides a control method for a semi-centralized open winding multi-motor drive system. To verify the effect of the present disclosure, a permanent magnet linear motor is selected. Parameters of the linear motor are as follows: the stator phase resistance is 3Ω, the stator phase inductance is $L_d = L_q = L_s = 33.5$ mH, and the permanent magnet flux linkage is 0.125 Wb. The conditions of three drive motors during steady state operation are verified through experiments.

The drive system is composed of N motors (N>0), one side of each rotor winding is respectively connected to an independent inverter, the other sides of all rotor windings are connected to a shared inverter together, and all rotors are rigidly connected.

The control method includes the following steps:

(1) In the semi-centralized open winding multi-motor drive system, a distribution mode of a thrust current is as follows:

a q axis current instruction $i^*_{q\_x}$ is distributed to a motor according to a thrust demand $F^*_e$:

$$i^*_{q\_x} = \dfrac{\tau_s F^*_e}{3 N \pi \psi_{f1}}$$

where $\psi_{f1}$ represents a permanent flux linkage of the motor, $\tau_s$ represents a polar distance of the same polarity between linear motors, and N represents the number of motors.

(2) A dq0 axis voltage required for each motor is computed:

a dq axis voltage is computed using a PI regulator:

$$\begin{cases} u_{d\_x} = k_{p\_d\_x}(i^*_{d\_x} - i_{d\_x}) + k_{i\_d\_x}\int(i^*_{d\_x} - i_{d\_x})dt \\ u_{d\_x} = k_{p\_q\_x}(i^*_{q\_x} - i_{q\_x}) + k_{i\_q\_x}\int(i^*_{q\_x} - i_{q\_x})dt \end{cases}$$

where $i_{d\_x}$, $i^*_{d\_x}$, $i_{q\_x}$ and $i^*_{q\_x}$ respectively represent actual dq axis currents and reference dq axis currents of the motor x, $u^*_{d\_x}$ and $u^*_{q\_x}$ represent voltage demands of the motor x, $k_{p\_d\_v}$, $k_{i\_d\_v}$, $k_{p\_q\_v}$ and $k_{i\_q\_v}$ respectively represent proportional coefficients and integral coefficients of a dq axis current regulator of the motor x, and x is the motor x, taking I, II, . . . , N.

A zero sequence voltage is computed by a PR regulator, as shown in the form of discretization:

$$u_k = K_{p\_PI} * e_k + b_0 * e_k + b_2 * e_{k-2} - a_1 u_{k-1} - a_2 u_{k-2}$$

$$\begin{cases} a_0 = -a_2 = \dfrac{4K_s\omega_c T_s}{4 + 4\omega_c T_s + \omega_0^2 T_s^2} \\ a_1 = 0, b_1 = 1 \\ b_1 = \dfrac{2\omega_0^2 T_s^2 - 8}{4 + 4\omega_c T_s + \omega_0^2 T_s^2}, b_2 = \dfrac{4 - 4\omega_c T_s + \omega_0^2 T_s^2}{4 + 4\omega_c T_s + \omega_0^2 T_s^2} \end{cases}$$

where $u_k$ represents a zero sequence voltage reference value $u^*_{0\_x}$ computed by the PR regulator at the time k, $e_k$ represents a difference value between 0 and a zero sequence current at the time k, subscripts k, k-1 and k-2 represent values at the time k, time k-1 and time k-2, $T_s$ represents a counting period of a real-time processor, $\omega_c$ represents a proportional resonant frequency, $\omega_0$ represents an electrical angular frequency of the motor, and $K_{p\_PI}$ and $K_s$ represent proportional resonant coefficients of the motor.

(3) A dq axis reference voltage of each motor is converted to the abc coordinate system:

$$\begin{bmatrix} u^*_{a\_x} \\ u^*_{b\_x} \\ u^*_{c\_x} \end{bmatrix} = \begin{bmatrix} \cos(\theta_x) & -\sin(\theta_x) & 1 \\ \cos(\theta_x - \tfrac{2}{3}\pi) & -\sin(\theta_x - \tfrac{2}{3}\pi) & 1 \\ \cos(\theta_x + \tfrac{2}{3}\pi) & -\sin(\theta_x - \tfrac{2}{3}\pi) & 1 \end{bmatrix} \begin{bmatrix} u^*_{d\_x} \\ u^*_{q\_x} \\ u^*_{0\_x} \end{bmatrix}$$

(4) A voltage modulation coefficient of each phase of each motor is computed:

$$m_{y\_x} = u^*_{y\_x}/u_{dc}$$

where $u^*_{y\_x}$ represents a phase voltage of the motor x, a subscript y represents a y phase, taking a, b or c, $u_{dc}$ represents a direct current voltage of the motor, and $m_{y\_x}$ represents a y-phase voltage modulation coefficient of the motor x.

Limit values of the voltage modulation coefficient are computed:

$$\begin{cases} m_{y\_max} = \max\{m_{y\_I}, m_{y\_II}, \ldots, m_{y\_N}\} \\ m_{y\_min} = \min\{m_{y\_I}, m_{y\_II}, \ldots, m_{y\_N}\} \end{cases}$$

where $m_{y\_max}$ represents a maximum voltage modulation coefficient of the y phase, and $m_{y\_min}$ represents a minimum voltage modulation coefficient of the y phase.

An operating area of the motor is judged:

$$k = \max\{m_{a\_max} - m_{a\_min}, m_{b\_max} - m_{b\_min}, m_{c\_max} - m_{c\_min}\}$$

in a case that k>1, the motor is located in an over-modulated area; otherwise, the motor is located in a linear modulation area.

(5) The over-modulated area is processed:

limit values of a corrected voltage modulation coefficient are computed:

$$\begin{cases} m^k_{y\_max} = \dfrac{m_{y\_max}}{\max\{1, m_{y\_max} - m_{y\_min}\}} \\ m^k_{y\_min} = \dfrac{m_{y\_min}}{\max\{1, m_{y\_max} - m_{y\_min}\}} \end{cases}$$

where $m_{y\_max}^k$ represents an improved maximum voltage modulation coefficient of the y phase, and $m_{y\_min}^k$ represents an improved minimum voltage modulation coefficient of the y phase;

corrected limit coefficients ($k_{y\_x}^{max}$, $k_{y\_x}^{min}$) of the voltage modulation coefficient are computed:

$$\begin{cases} k^{max}_{y\_x} = \dfrac{\min\{m_{y\_x}, m^k_{y\_max}\}}{m_{y\_x}} \\ k^{min}_{y\_x} = \dfrac{\max\{m_{y\_x}, m^k_{y\_min}\}}{m_{y\_x}} \end{cases}$$

a phase correction coefficient $k_{y\_x}$ of the voltage modulation coefficient of each phase is computed:

$$k_{y\_x} = \min\{k_{y\_x}^{max}, k_{y\_x}^{min}\}$$

a correction coefficient $k_x$ of the motor of the voltage modulation coefficient is computed:

$$k_x = \min\{k_{a\_x}, k_{b\_x}, k_{c\_x}\}$$

a voltage modulation coefficient corrected value $m_y^k$ is computed by the corrected value and the voltage modulation coefficient:

$$m_{y\_x}^k = k_x m_{y\_x}$$

(6) Limit duty ratios ($\delta_{y\_s\_max}$, $\delta_{y\_s\_max}$) of a shared bridge arm are computed:

$$\begin{cases} \delta_{y\_s\_max} = \min\{1 - m^k_{y\_max}, 1\} \\ \delta_{y\_s\_min} = \max\{-m^k_{y\_min}, 0\} \end{cases}$$

an optimal duty ratio $\delta_{y\_s}$ of the shared bridge arm is computed by the limit duty ratios:

$$\delta_{y\_s} = \dfrac{\delta_{y\_s\_max} + \delta_{y\_s\_min}}{2}$$

a duty ratio of an independent bridge arm is computed based on the optimal duty ratio of the shared bridge arm and the voltage modulation coefficient:

$$\delta_{y\_x} = m_{y\_x}{}^k + \delta_{y\_P} \qquad 5$$

Figure 2:
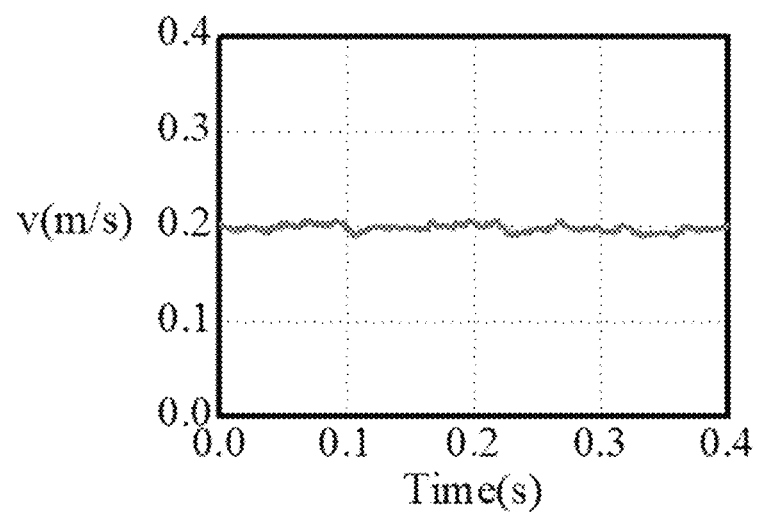
FIG. 2 is a velocity diagram of a drive system during steady state operation in the present disclosure.
Figure 3:
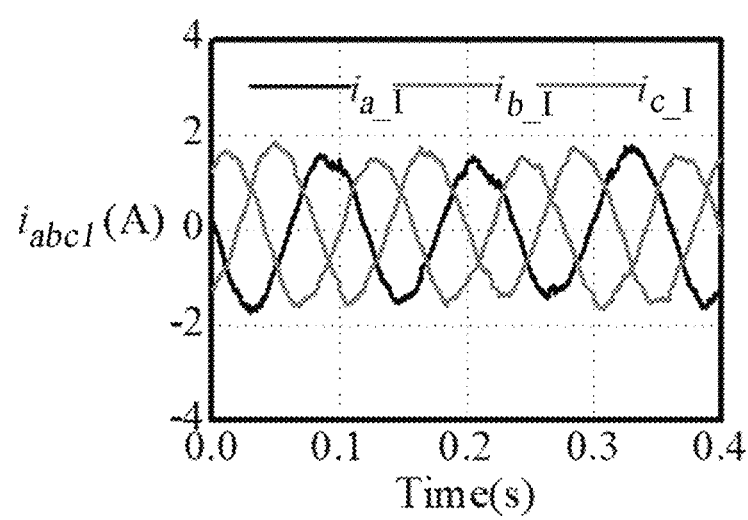
FIG. 3 is a three-phase current diagram of a motor I during steady state operation in the present disclosure.
Figure 4:
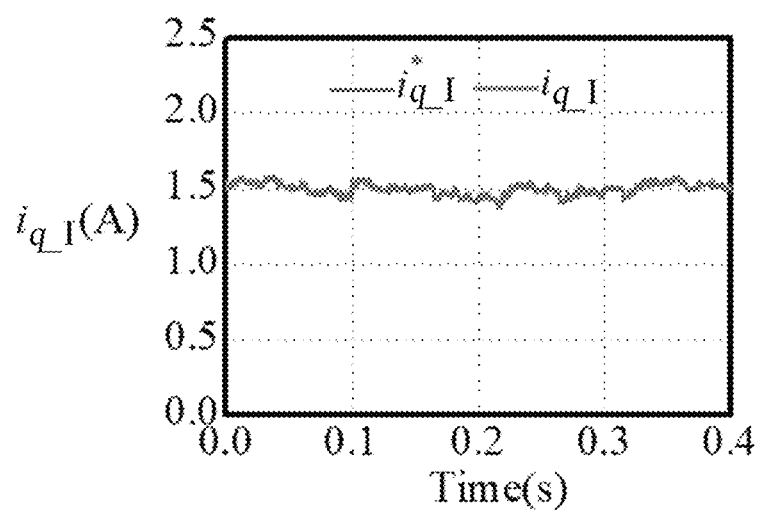
FIG. 4 is a q axis current diagram of a motor I during steady state operation in the present disclosure.
Figure 5:
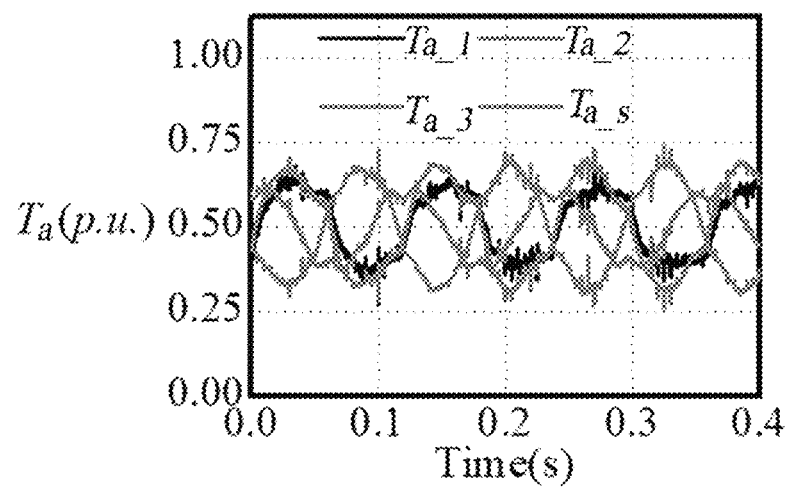
FIG. 5 shows a duty ratio of an A phase during steady state operation in the present disclosure.

FIG. 2 is a velocity diagram of a drive system during steady state operation, which can be seen that the velocity control in the present disclosure is relatively accurate and stable. FIG. 3 is a three-phase current diagram of a motor I during steady state operation, which can be seen that the present disclosure can achieve relatively stable control and better performance for a multi-motor system. FIG. 4 is a q axis current diagram of a motor I during steady state operation, which can be seen that the present disclosure is capable of following a torque instruction. FIG. 5 shows a duty ratio of an A phase during steady state operation, which can be seen that the duty ratio distribution mode of each inverter of the A phase is basically consistent with the proposed strategy. In the descriptions of this specification, a description of a reference term such as "an embodiment", "an example", or "a specific example" means that a specific feature, structure, material, or characteristic that is described with reference to the embodiment or the example is included in at least one embodiment or example of the present disclosure. In this specification, exemplary descriptions of the foregoing terms do not necessarily refer to the same embodiment or example. In addition, the described specific features, structures, materials, or characteristics may be combined in a proper manner in any one or more of the embodiments or examples.

The foregoing displays and describes basic principles, main features of the present disclosure and advantages of the present disclosure. A person skilled in the art may understand that the present disclosure is not limited to the foregoing embodiments. Descriptions in the embodiments and this specification only illustrate the principles of the present disclosure. Various modifications and improvements are made in the present disclosure without departing from the spirit and the scope of the present disclosure, and these modifications and improvements shall fall within the protection scope of the present disclosure.

What is claimed is:

1. A control method for a semi-centralized open winding multi-motor drive system, wherein the drive system is composed of N motors (N>0), one side of each rotor winding is respectively connected to an independent inverter, the other sides of all rotor windings are connected to a shared inverter together, and all rotors are rigidly connected;

the control method comprises the following steps:

step 1: distributing a q axis current instruction $i^*_{q\_x}$ to a motor according to a thrust demand $F^*_e$:

$$i^*_{q\_x} = \frac{\tau_s F^*_e}{3N\pi\psi_{f1}}$$

wherein $\psi_{f1}$ represents a permanent flux linkage of the motor, $\tau_s$ represents a polar distance of the same polarity between linear motors, and N represents the number of motors;

step 2: computing a dq0 axis voltage required for each motor:

first, computing a dq axis voltage using a proportional integral (PI) regulator:

$$\begin{cases} u_{d\_x} = k_{p\_d\_x}(i^*_{d\_x} - i_{d\_x}) + k_{i\_d\_x}\int (i^*_{d\_x} - i_{d\_x})dt \\ u_{d\_x} = k_{p\_q\_x}(i^*_{q\_x} - i_{q\_x}) + k_{i\_q\_x}\int (i^*_{q\_x} - i_{q\_x})dt \end{cases}$$

wherein $i_{d\_x}$, $i^*_{d\_x}$, $i_{q\_x}$ and $i^*_{q\_x}$ respectively represent actual dq axis currents and reference dq axis currents of the motor x, $u^*_{d\_x}$ and $u^*_{q\_x}$ represent voltage demands of the motor x, $k_{p\_d\_v}$, $k_{i\_d\_v}$, $k_{p\_q\_v}$ and $k_{i\_q\_v}$ respectively represent proportional coefficients and integral coefficients of a dq axis current regulator of the motor x, and x is the motor x, taking I, II, . . . , N;

then, computing a zero sequence voltage by a proportional resonant (PR) regulator, as shown in the form of discretization:

$$u_k = K_{p\_PI} * e_k + b_0 * e_k + b_2 * e_{k-2} - a_1 u_{k-1} - a_2 u_{k-2}$$

$$\begin{cases} a_0 = -a_2 = \frac{4K_s \omega_c T_s}{4 + 4\omega_c T_s + \omega_0^2 T_s^2} \\ a_1 = 0, b_1 = 1 \\ b_1 = \frac{2\omega_0^2 T_s^2 - 8}{4 + 4\omega_c T_s + \omega_0^2 T_s^2}, b_2 = \frac{4 - 4\omega_c T_s + \omega_0^2 T_s^2}{4 + 4\omega_c T_s + \omega_0^2 T_s^2} \end{cases}$$

wherein $u_k$ represents a zero sequence voltage reference value $u^*_{0\_x}$ computed by the PR regulator at the time k, $e_k$ represents a difference value between 0 and a zero sequence current at the time k, subscripts k, k-1 and k-2 represent values at the time k, time k-1 and time k-2, $T_s$ represents a counting period of a real-time processor, $\omega_c$ represents a proportional resonant frequency, $\omega_0$ represents an electrical angular frequency of the motor, and $K_{p\_PI}$ and $K_s$ represent proportional resonant coefficients of the motor;

step 3: converting a dq axis reference voltage of each motor to the abc coordinate system:

$$\begin{bmatrix} u^*_{a\_x} \\ u^*_{b\_x} \\ u^*_{c\_x} \end{bmatrix} = \begin{bmatrix} \cos(\theta_x) & -\sin(\theta_x) & 1 \\ \cos(\theta_x - \frac{2}{3}\pi) & -\sin(\theta_x - \frac{2}{3}\pi) & 1 \\ \cos(\theta_x + \frac{2}{3}\pi) & -\sin(\theta_x - \frac{2}{3}\pi) & 1 \end{bmatrix} \begin{bmatrix} u^*_{d\_x} \\ u^*_{q\_x} \\ u^*_{0\_x} \end{bmatrix}$$

step 4: computing a voltage modulation coefficient of each phase of each motor:

$$m_{y\_x} = u^*_{y\_x}/u_{dc}$$

wherein $u^*_{y\_x}$ represents a phase voltage of the motor x, a subscript y represents a y phase, taking a, b or c, $u_{dc}$ represents a direct current voltage of the motor, and $m_{y\_x}$ represents a y-phase voltage modulation coefficient of the motor x;

computing limit values of the voltage modulation coefficient:

$$\begin{cases} m_{y\_max} = \max\{m_{y\_I}, m_{y\_II}, \ldots, m_{y\_N}\} \\ m_{y\_min} = \min\{m_{y\_I}, m_{y\_II}, \ldots, m_{y\_N}\} \end{cases}$$

wherein $m_{y\_max}$ represents a maximum voltage modulation coefficient of the y phase, and $m_{y\_min}$ represents a minimum voltage modulation coefficient of the y phase;

judging an operating area of the motor:

$$k=\max\{m_{a\_max}-m_{a\_min}, m_{b\_max}-m_{b\_min}, m_{c\_max}-m_{c\_min}\}$$

wherein in a case that k>1, the motor is located in an over-modulated area, otherwise, the motor is located in a linear modulation area;

step 5: processing the over-modulated area:

computing limit values of a corrected voltage modulation coefficient:

$$\begin{cases} m_{y\_max}^k = \dfrac{m_{y\_max}}{\max\{1, m_{y\_max} - m_{y\_min}\}} \\ m_{y\_min}^k = \dfrac{m_{y\_min}}{\max\{1, m_{y\_max} - m_{y\_min}\}} \end{cases}$$

wherein $m_{y\_max}^k$ represents an improved maximum voltage modulation coefficient of the y phase, and $m_{y\_min}^k$ represents an improved minimum voltage modulation coefficient of the y phase;

computing corrected limit coefficients ($k_{y\_x}^{max}$, $k_{y\_x}^{min}$) of the voltage modulation coefficient:

$$\begin{cases} k_{y\_x}^{max} = \dfrac{\min\{m_{y\_x}, m_{y\_max}^k\}}{m_{y\_x}} \\ k_{y\_x}^{min} = \dfrac{\max\{m_{y\_x}, m_{y\_min}^k\}}{m_{y\_x}} \end{cases}$$

computing a phase correction coefficient $k_{y\_x}$ of the voltage modulation coefficient of each phase:

$$k_{y\_x} = \min\{k_{y\_x}^{max}, k_{y\_x}^{min}\}$$

computing a correction coefficient $k_x$ of the motor of the voltage modulation coefficient:

$$k_x = \min\{k_{a\_x}, k_{b\_x}, k_{c\_x}\}$$

computing a voltage modulation coefficient corrected value $m_y^k$ by the corrected value and the voltage modulation coefficient:

$$m_{y\_x}^k = k_x m_{y\_x}$$

step 6: computing limit duty ratios ($\delta_{y\_s\_max}$, $\delta_{y\_s\_max}$) of a shared bridge arm:

$$\begin{cases} \delta_{y\_s\_max} = \min\{1 - m_{y\_max}^k, 1\} \\ \delta_{y\_s\_min} = \max\{-m_{y\_min}^k, 0\} \end{cases}$$

computing an optimal duty ratio $\delta_{y\_s}$ of the shared bridge arm by the limit duty ratios:

$$\delta_{y\_s} = \dfrac{\delta_{y\_s\_max} + \delta_{y\_s\_min}}{2}$$

computing a duty ratio of an independent bridge arm based on the optimal duty ratio of the shared bridge arm and the voltage modulation coefficient:

$$\delta_{y\_x} = m_{y\_x}^k + \delta_{y\_p}.$$

* * * * *